United States Patent [19]

Kanda

[11] Patent Number: 5,067,118
[45] Date of Patent: Nov. 19, 1991

[54] POSITION DETECTING DEVICE FOR USE BY SWITCHING PLURAL ALTERNATING SIGNALS HAVING DIFFERENT PHASES FROM EACH OTHER

[75] Inventor: Shigeto Kanda, Machida, Japan

[73] Assignee: Canon Kabushiki Kaisha, Tokyo, Japan

[21] Appl. No.: 334,195

[22] Filed: Apr. 6, 1989

[30] Foreign Application Priority Data

Apr. 7, 1988 [JP] Japan .................. 63-084024

[51] Int. Cl.$^5$ .............................................. G11B 7/00
[52] U.S. Cl. .............................. 369/44.27; 369/44.35; 369/48; 369/44.25; 360/78.11
[58] Field of Search .... 369/44.24, 44.25, 44.26–44.42, 369/106, 121, 124, 52, 48, 50, 57, 55, 56, 111, 124; 358/322, 342; 360/78.04, 78.11; 250/231.17, 231.18, 231.13

[56] References Cited

U.S. PATENT DOCUMENTS

| 4,416,002 | 9/1983 | Oguino et al. | 369/275.4 |
| 4,443,869 | 4/1984 | Ammon | 369/41 |
| 4,464,689 | 8/1984 | Propst | 360/78 |
| 4,510,537 | 4/1985 | Yoshida et al. | 360/78.04 |
| 4,590,527 | 5/1986 | Waner | 360/78.11 |
| 4,878,135 | 10/1989 | Makino et al. | 360/78.04 |

FOREIGN PATENT DOCUMENTS

| 0102057 | 3/1984 | European Pat. Off. |
| 0307130 | 3/1989 | European Pat. Off. |
| 2054135 | 2/1981 | United Kingdom |

Primary Examiner—Roy N. Envall, Jr.
Assistant Examiner—Thang V. Tran
Attorney, Agent, or Firm—Fitzpatrick, Cella, Harper & Scinto

[57] ABSTRACT

A position detecting device includes a: generator for generating a plurality of phase-shifted signals which are alternately changed in accordance with changes in position or angle of a movable member; a selector for selecting one of the plurality of signals; supplier for supplying a variable level signal; adder for adding a signal selected by the selector and the variable level signal from the signal supplier and outputting a sum signal as a position detection signal; a detector for detecting a phase of the selected signal; and a controller for switching the signal selected by the selector and changing a level of the variable level signal from the signal supplier in accordance with an output from the phase detector.

26 Claims, 8 Drawing Sheets

POSITION DETECTING DEVICE FOR USE BY SWITCHING PLURAL ALTERNATING SIGNALS HAVING DIFFERENT PHASES FROM EACH OTHER

BACKGROUND OF THE INVENTION

1. Field of the Invention

The present invention relates to a position detecting device for obtaining displacement information of a movable member and more particularly, to a position detecting device for obtaining displacement information suitable for slowly moving an optical head or an information recording medium in, e.g., an optical information recording/reproducing apparatus.

2. Related Background Art

FIG. 1 is a block diagram showing a main portion of a conventional optical disk apparatus.

Referring to FIG. 1, light emitted from a laser diode 20 is collimated by a collimation lens 19, and the collimated light ray is reflected by a mirror 13 through a polarizing beam splitter 44 and is focused on a recording layer of an optical disk 10 through an objective lens 12.

The reflected light from the optical disk 10 is reflected again by the mirror 13 through the objective lens 12. The reflected light is then reflected downward by the polarizing beam splitter 44. One portion of the light partially reflected by a half mirror 15 is detected by a photodetector 18 through a lens 17, and the detected optical information is input to a radio-frequency (RF) signal amplifier 23. Another portion of the light passing through the half mirror 15 is detected by a four-split beam detector 16. An output from the detector 16 is input to a position error signal processing circuit 25.

An output from the position error signal processing circuit 25 is input to a focusing/tracking servo circuit 21, and an output from the servo circuit 21 is used to finely adjust the objective lens 12.

A voice coil motor (VCM) servo circuit 24 controls an optical head 11 to move the head to a position near a desired track and to stop the head on the desired track in accordance with track selection data from a microprocessor unit (MPU) 27. The MPU 27 controls a spindle motor 29 for rotating the optical disk 10 by using a spindle motor servo circuit 26 and an encoder 28. The MPU 27 also controls emission of light from the laser diode 20 through a laser driver 22.

A linear encoder shown in FIG. 2 is arranged between the optical head 11 and a housing 45. A movable slit member 31 is engaged with the optical head 11 and is moved together with the optical head 11. A stationary slit member 30, light-emitting diodes (LEDs) 32 and 33, and phototransistors (PTr) 34 and 35 are fixed on the housing 45. The positional relationship between the movable slit member 31, the stationary slit member 30, the LEDs 32 and 33, and the PTrs 34 and 35 is illustrated in FIG. 3. That is, the LED 32 opposes the PTr 34, and the LED 33 opposes the PTr 35. The phase of the fixed slit between the LED 32 and the PTr 34 is shifted from that of the fixed slit between the LED 33 and PTr 35 by 90°. Outputs from the PTrs 34 and 35 are input to current-voltage converters 36 and 37, and outputs from the current-voltage converters 36 and 37 are partially input to inverting amplifiers 38 and 39, as shown in FIG. 4, to obtain four-phase alternating signals phase-shifted from each other by 90° as shown in FIG. 5.

In order to continuously record or reproduce information, a spiral groove (track) called a pregroove is formed in the optical disk beforehand to perform tracking guidance. The optical head, for example, is controlled to be stopped at point A of the first phase shown in FIG. 5, and the position of the objective lens is controlled to trace the spiral track.

The objective lens is moved by an actuator (not shown) in the tracking direction. Since the range of displacement of the objective lens is limited, the entire optical head is moved to control the objective lens within displacement range.

FIG. 6 is a conventional position control block diagram of an optical head using a voice coil motor. A difference between a target value and the actual displacement of the optical head, as determined from a position detecting device 40 using the linear encoder as described above, is input to a phase compensator 41. A predetermined amount of current is supplied to a voice coil motor 43 through a driver 42, thereby moving the optical head. Since the voice coil motor 43 does not normally have stress such as a spring bias in a movable direction, when the motor current is zero, the optical head is stopped at an arbitrary position. For this reason, when the target value in FIG. 6 is set to be 0 (V), the position of the optical head is controlled to be at point A of the first phase.

During continuous recording/reproduction, when the objective lens traces the spiral track and is moved toward the center of the disk, the entire optical head is moved toward the center of the disk to bring the objective lens to the center of operation.

For this reason, when the position of the optical head is to be at the A point of the first phase in FIG. 5, the position control output from the linear encoder is changed from an output of the first phase to an output of the second phase. The optical head reaches the D point in the order of A, B, C, and D as shown in FIG. 5. If the optical head must be at the center of the optical disk, the position control output from the linear encoder is changed from the output of the second phase to an output of the third phase under the condition that the position of the optical head is controlled to be at the position D. Then, the optical head reaches the G point in the order of D, E, F, and G. In this manner, the optical head is sequentially moved.

However, when the operating points are changed in the orders of A, B, C, and D, and D, E, F, and G, currents corresponding to these orders are supplied to the voice coil motor. In particular, the operating points are discontinuous in the orders of A to B and D to E, and accelerations are increased. Therefore, tracking servo is adversely affected such that control errors occur and servo synchronization is out of step for instance.

When the optical disk apparatus receives an external impact, causing vibrations in the optical head feed direction, the optical head is braked to a control position by the position control. If the control gain is kept unchanged, resistance to impact and vibrations is associated with a detection region of the position detecting device. Assume that the external impact acts in the optical head feed direction while the position of the optical head is controlled to the D point of the second phase in FIG. 5. The operating point is shifted to the left and right along a curve of the second phase by the impact force. At this time, during movement of the optical head in an order of D, C, and B, or D, H, and I, the amplitude is increased with an increase in displacement, so that a restoration force is increased accordingly. However, during the displacement in an order of B, L, and M, or I, J, and K, the restoration force is decreased. When the optical head is moved over the M point to the left or over the K point to the right, it falls within a positive feedback region and therefore is quickly moved to the N point away from point D of the curve of the second phase by one period and to a point (not shown) to the right of point O by one step. This state inconvenient, because tracking servo control is adversely affected, and a stop position of the optical head cannot be determined by position control.

SUMMARY OF THE INVENTION

It is an object of the present invention to provide a position detection device for solving the conventional problems described above and performing smooth movement of a movable member without adversely affecting position control.

It is another object of the present invention to provide a position detecting device capable of performing position control having high resistance to impact and vibrations.

In order to achieve the above objects of the present invention, there is provided a position detecting device including:

means for generating a plurality of phase-shifted signals which are alternately changed in accordance with changes in position or angle of a movable member;

means for selecting one of a plurality of signals;

means for supplying a variable level signal;

means for adding a signal selected by the selecting means and the variable level signal from the signal supplying means and outputting a sum signal as a position detection signal;

means for detecting a phase of the selected signal;

and control means for switching the signal selected by the selecting means and changing a level of the variable level signal from the signal supplying means in accordance with an output from the phase detecting means.

DETAILED DESCRIPTION OF THE PREFERRED EMBODIMENTS

Figure 1:
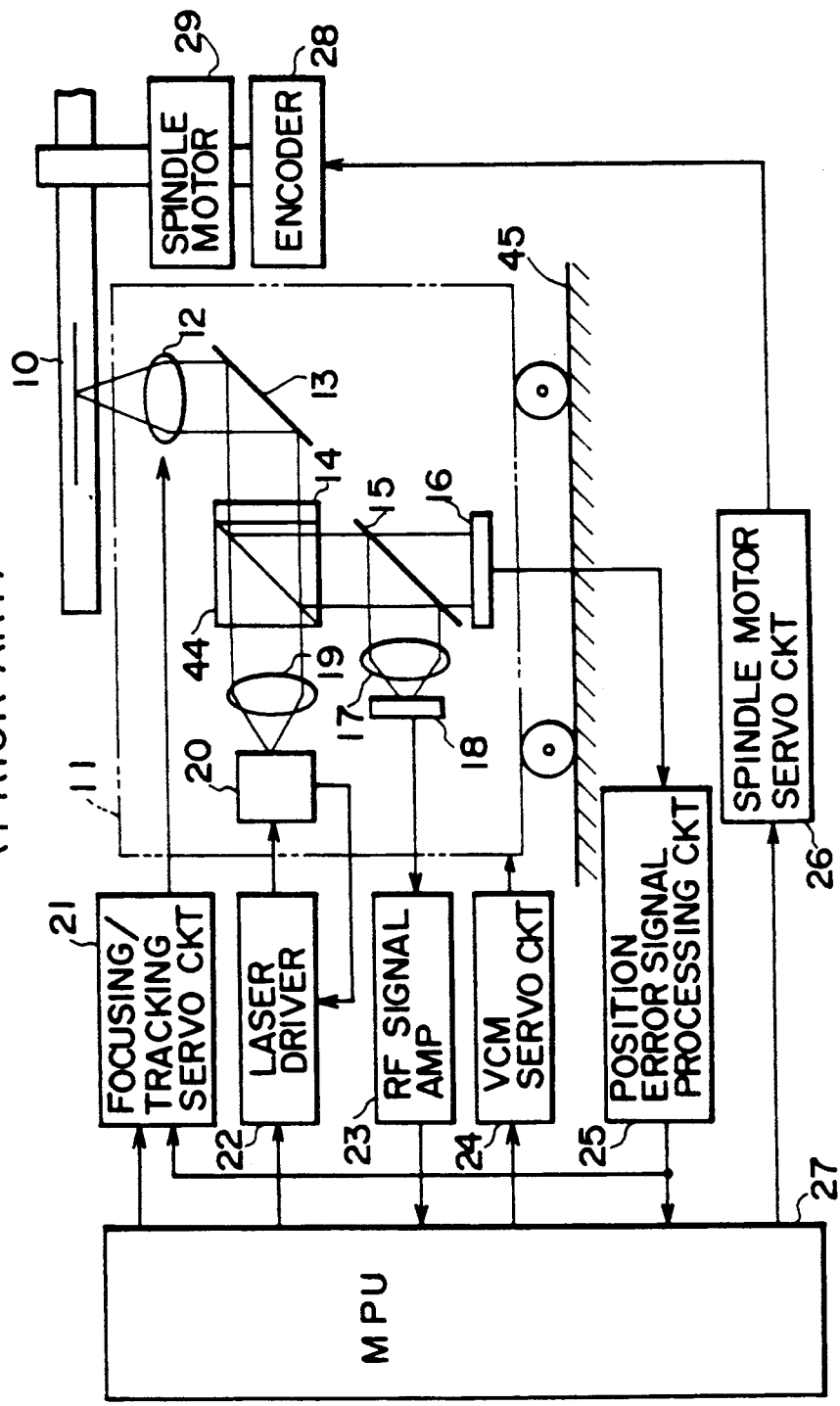
FIG. 1 is a block diagram showing a main portion of a conventional optical disk apparatus.
Figure 2:
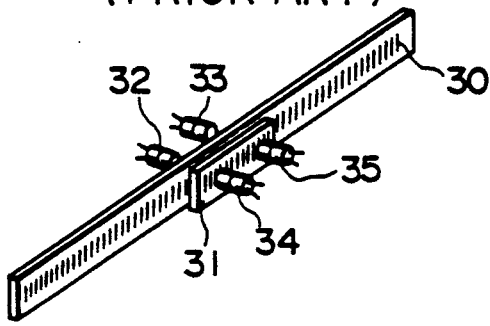
FIGS. 2 and 3 are a perspective view and a schematic view, respectively, showing a linear encoder used in the apparatus shown in FIG. 1.
Figure 3:
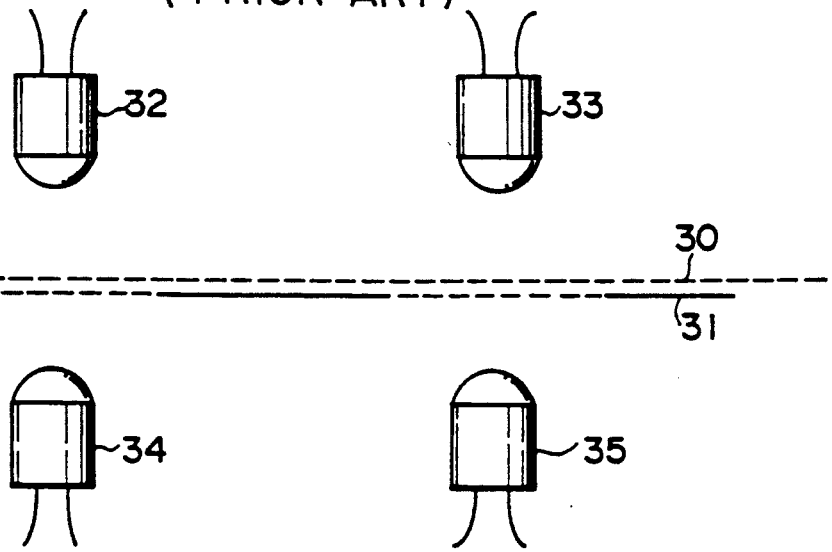
Figure 4:
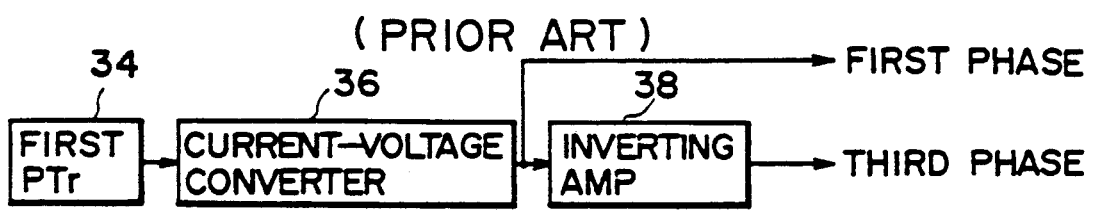
FIG. 4 is a block diagram showing a conventional position detecting device.
Figure 4:
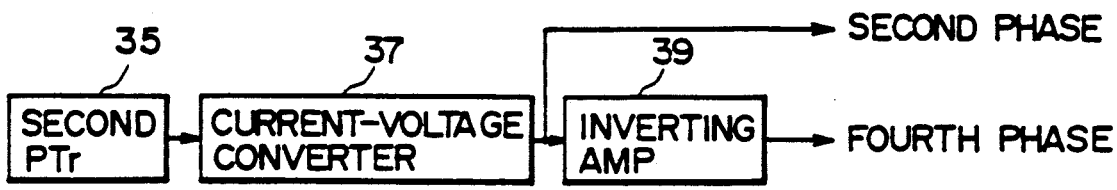
Figure 5:
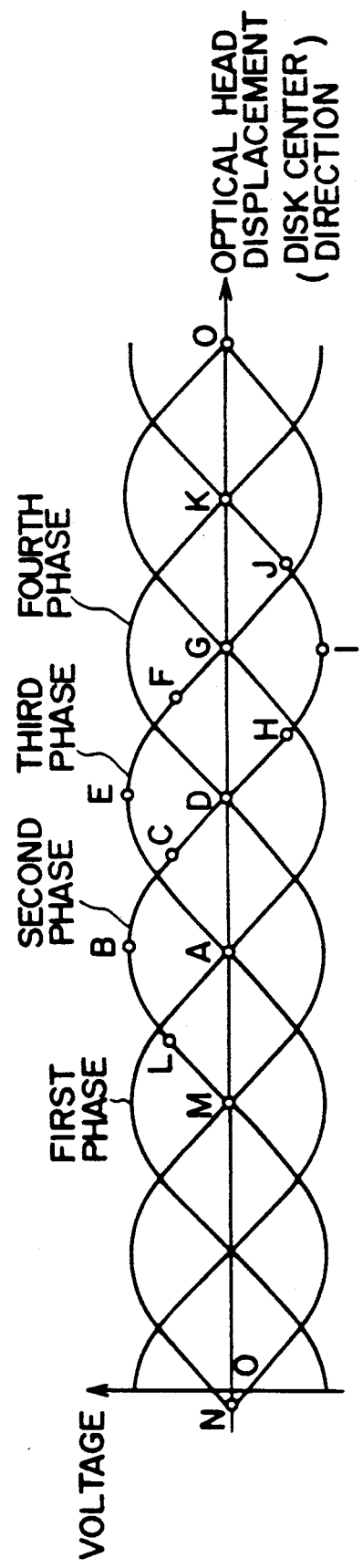
FIG. 5 is a graph showing an output signal from the conventional position detecting device.
Figure 6:
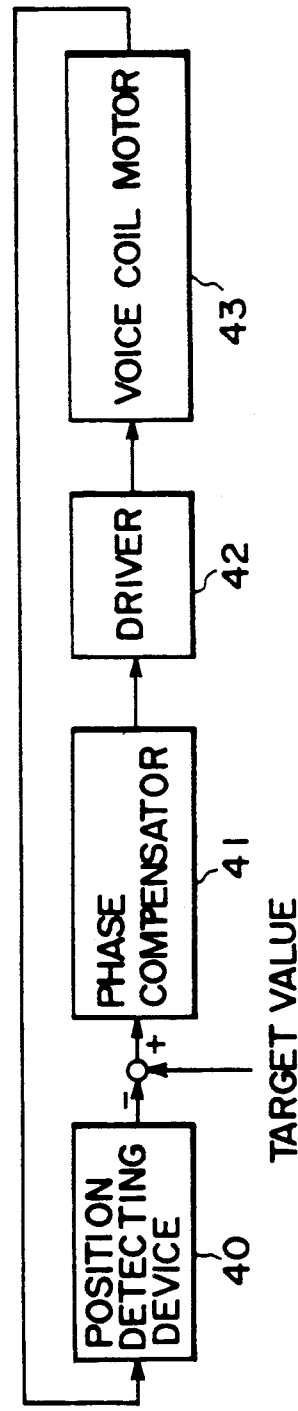
FIG. 6 is a block diagram showing an operation of a voice coil motor.
Figure 8:
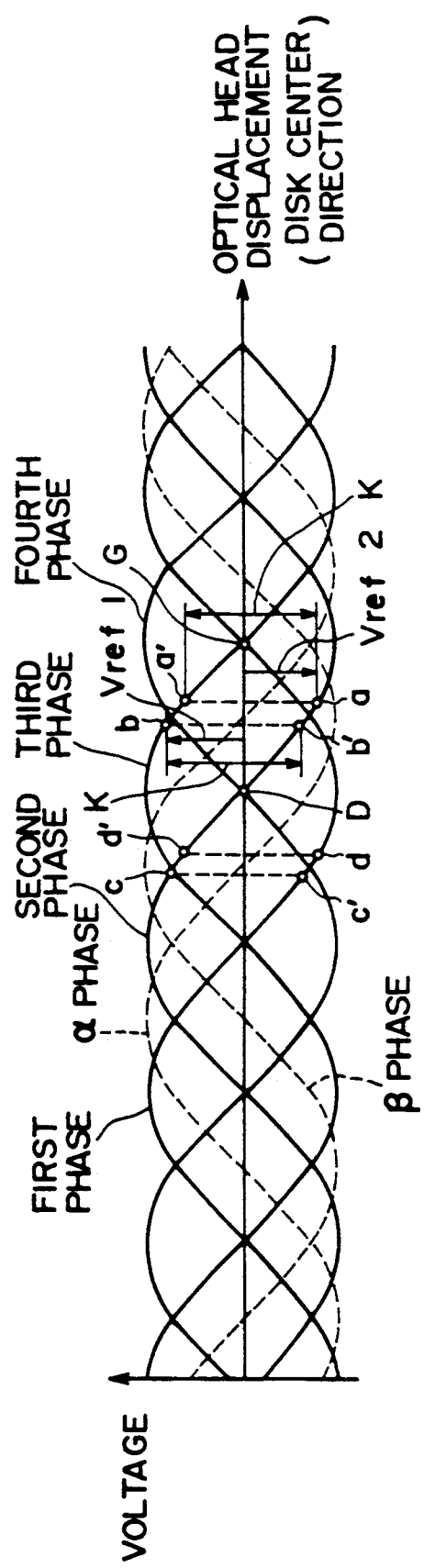
FIG. 8 is a graph showing a plurality of alternating signals and operating points in each embodiment of the present invention.

Preferred embodiments of the present invention will be described with reference to the accompanying drawings. In each embodiment to be described below, a linear encoder is arranged between an optical head main body and a housing of an optical disk apparatus, as in the arrangement is shown in FIGS. 1, 2, 3, 4, and 6 in the same manner as in the conventional case. In order to explain an operation of each embodiment, a graph shown in FIG. 8 is used in place of that in FIG. 5.

A first embodiment of the present invention will be described below.

Figure 7:
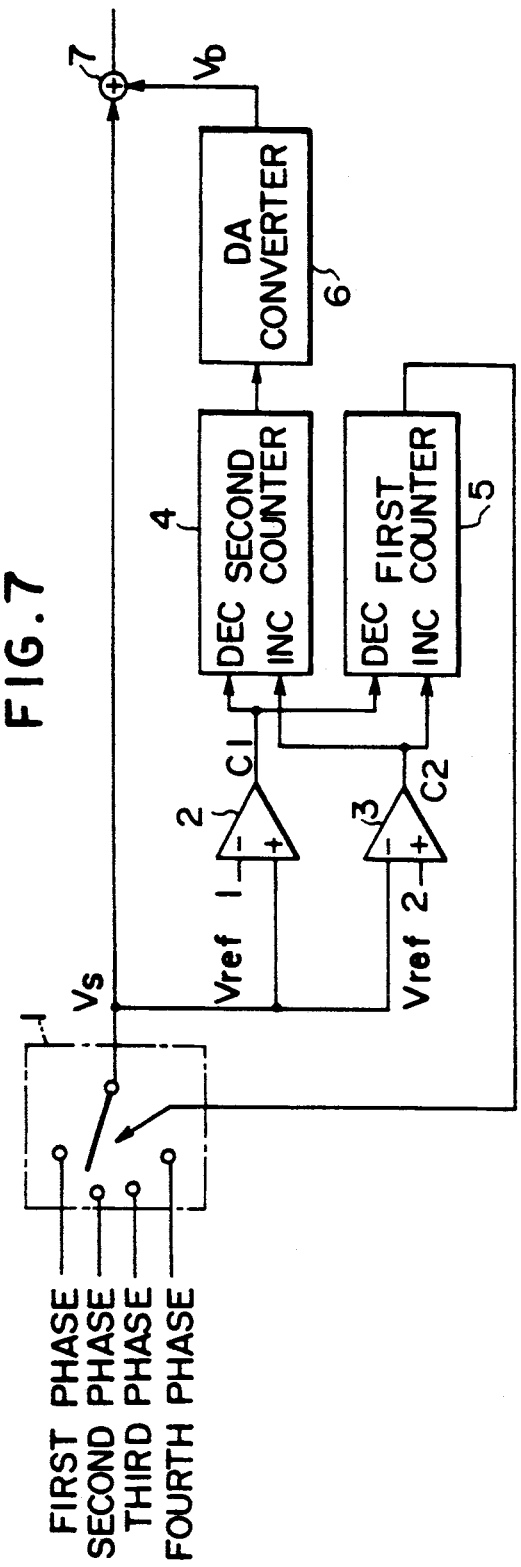
FIG. 7 is a block diagram showing a first embodiment of the present invention.

FIG. 7 is a block diagram of a position detection device according to the first embodiment. A multiplexer 1 selects one of a plurality of signals having the first to fourth phases. The first to fourth phases correspond to those in FIGS. 4 and 5. The multiplexer 1 generates an output VS. Voltage comparators 2 and 3 have reference voltages Vref1 and Vref2, respectively. An output C1 from the voltage comparator 2 is input to the DEC terminals of first and second counters 5 and 4. The counters 4 and 5 are decremented at a leading edge of the output C1. An output C2 from the voltage comparator 3 is input to the INC terminals of the counters 4 and 5. The counters are incremented at a leading edge of the output C2. The first counter 5 is a 2-bit up/down counter capable of taking values 1, 2, 3, and 4 and repeats an incrementing operation in an order of 1, 2, 3, 4, 1. When the counter 5 performs a decrementing operation, its count is changed to an order of 4, 3, 2, 1, 4. The multiplexer 1 selects a phase signal corresponding to the content of the counter 5 and generates the selected phase signal as the output VS. For example, if the content of the counter 5 is 2, a signal of the second phase serves as the output VS from the multiplexer 1. The second counter 4 is also an up/down counter and takes values in the range of −2, −1, 0, 1, and 2. The content of the counter 4 is converted into a voltage VD by a digital-to-analog (DA) converter 6. The voltage VD is added to the output VS from the multiplexer 1 by an adder 7. A coefficient of conversion between the content of the counter 4 and the output VD from the DA converter 6 is given as K. For example, if the content of the counter 4 is 2, then VD=2K (V).

An operation of an optical disk apparatus upon receiving an external impact will be described with reference to FIG. 8. Assume that the initial content of the first counter 5 is 2, that the initial content of the second counter 4 is 0, and that the initial operating point is the D point (VD=0) of the second phase. When the optical head is moved to the left (i.e., the direction toward the center of the disk) by an impact force, the amplitude is increased from D to a in accordance with the head displacement, and the restoration force is increased accordingly. When the optical head reaches the a point, the output C2 from the voltage comparator 3 in FIG. 7 rises. That is, the reference voltage Vref2 is set to be equal to an alternating signal voltage at the a point. The counters 5 and 4 are incremented, and their contents are updated to 3 and 1, respectively. For this reason, a phase selected by the multiplexer 1 is changed to the third phase. An output from the DA converter 6 is set to be VD=K. Note that K is selected to be a voltage value corresponding to a potential difference between the a and a' points. Therefore, the operating point is smoothly shifted from the a point to the a' point. When the optical head is greatly vibrated and is further moved to the right, the optical head is moved from the a' point to the right along the curve of the third phase, and the phase is changed to the fourth phase in the same manner as described above. When the impact force is weakened and the optical head is moved to the left along the curve of the third phase, the phase at the a' point is kept unchanged. The output C1 from the voltage comparator 2 rises at the b point. That is, the reference voltage Vref1 is set to be equal to the alternating signal voltage at the b point. Therefore, the counters 5 and 4 are decremented to 2 and 0, respectively. A phase selected by the multiplexer 1 is changed to the second phase, and an output from the DA converter 6 is set to be VD=0. Since the upper peak of each alternating signal is equal to its lower peak, a voltage value corresponding to a difference between the b and b' points is equal to that corresponding to the difference between the a and a' points. That is, the voltage value is equal to K. Therefore, the operating point is smoothly shifted from the b point to the b' point. The optical head is moved from the b' point to the left along the curve of the second phase. Bidirectional switching is not performed at points such as a' and b' to provide hysteresis for preventing oscillation and for stabilizing the operation.

When the initial operating point is moved from the D point of the second phase to the left, the phase is changed at the C point. When the initial operating point is changed to the right after the C point, the phase is changed at the d point.

With the above arrangement, a monotonous increase region for position detection can be equivalently increased, and resistance to external vibrations and impact can be greatly increased during position control.

A second embodiment of the present invention will be described below.

Figure 9:
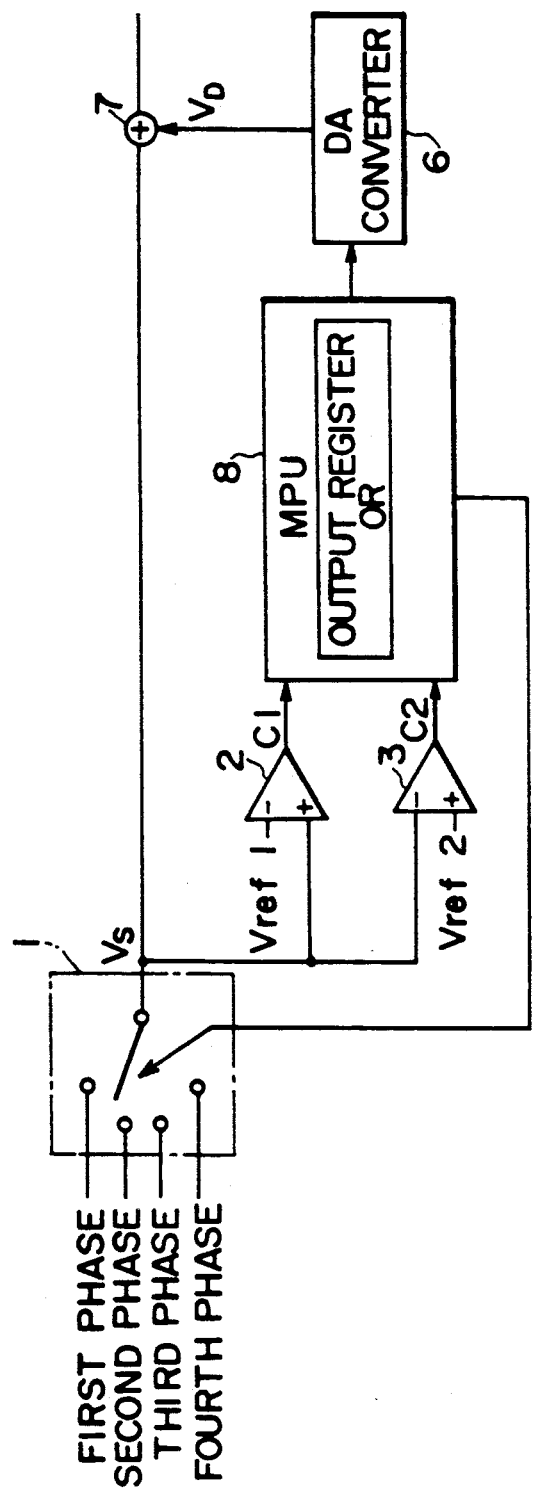
FIG. 9 is a block diagram showing a second embodiment of the present invention.

FIG. 9 is a block diagram of a position detection device according to the second embodiment. The device is substantially the same as that of the first embodiment except that the counters 5 and 4 are replaced with a general-purpose microprocessor unit (MPU) 8.

Figure 10:
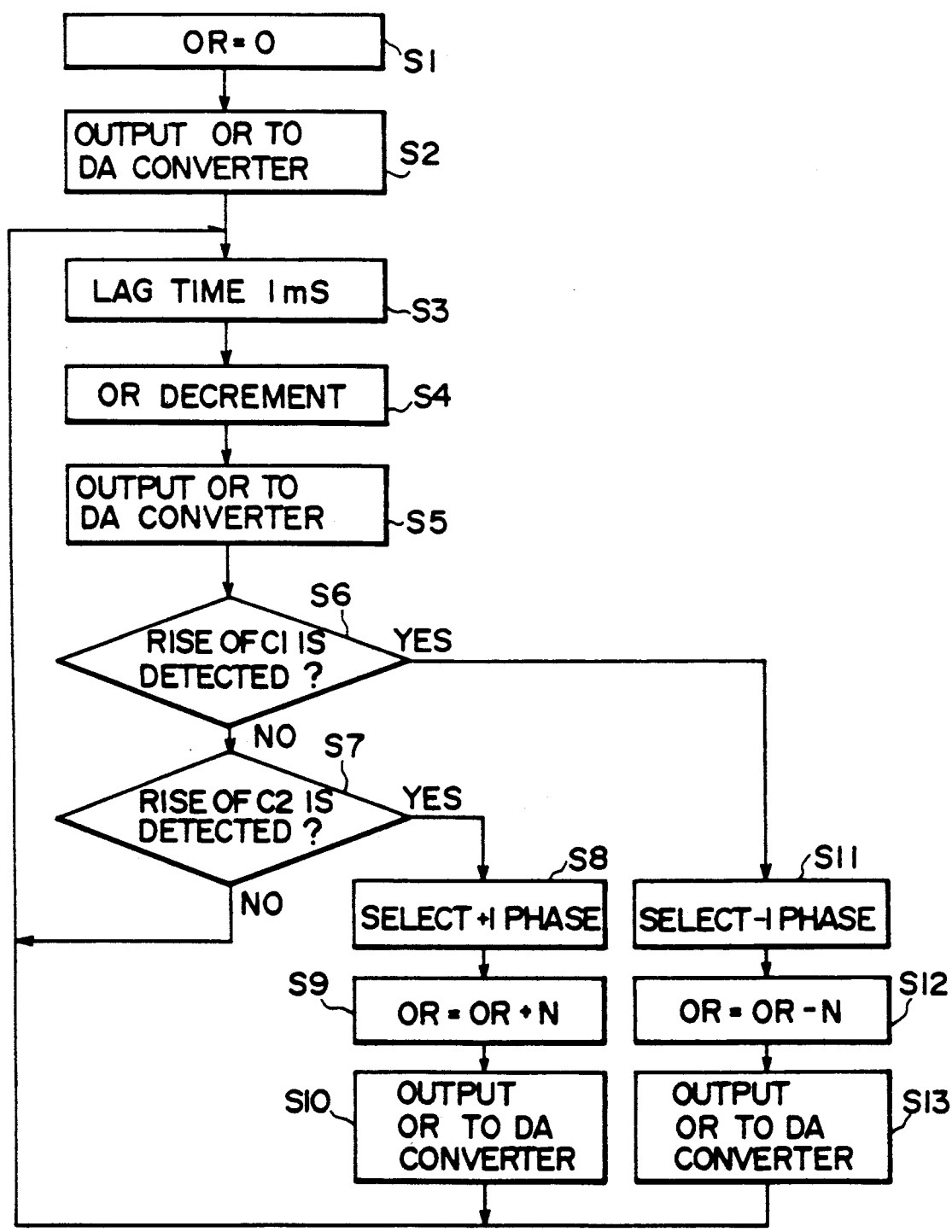
FIG. 10 is a flow chart for explaining an operation of the second embodiment.

FIG. 10 is a flow chart of an operation in which an optical head is gradually moved by using the MPU 8. The MPU 8 includes an output register OR for outputting a signal to a DA converter 6.

An operation for gradually moving an optical head will be described with reference to FIGS. 8 and 10.

Assume that the position of the optical head is controlled to the D point of the second phase in FIG. 8. Operations in steps S1 and S2 are performed to set a position control target value to 0 V. In step S3, a lag time of 1 mS is allowed to pass. In steps S4 and S5, the DA converter output VD serving as the target value is decreased by one count of the output register OR. That is, the content of the output register OR is decremented by one. The one-count VD value is set to be 1/64 of the voltage value K between the a and a' points. Reference voltages are set to be Vref2 = −K/2 −3K/64 and Vref1 = K/2+3K/64. In steps S6 and S7, rising of outputs C1 and C2 from voltage comparators 2 and 3 is determined. Since no rising occurs, the flow returns to step S3. The operations in steps S3 to S7 are repeated and the content of the output register OR is decremented one by one when the operating point is shifted between the D point and the a point. When the operating point reaches the a point, YES is obtained in step S7, and the flow advances to step S8. Vref2 = −K/2−3K/64 and the count of the output register OR which corresponds to K is 64. Therefore, the count required to shift the operating point from the D point to the a point is 35, i.e., the corresponding content of the output register OR is −35.

In step S8, a value corresponding to the second phase is incremented by one to select the third phase. In steps S9 and S10, a value obtained by adding the content of the output register OR to a predetermined value N (N is 64) is output as the target value VD. Therefore, the content of the output register OR is 29 (=−35+64). Since a voltage at the a point is the reference voltage Vref2 = −K/2−3K/64 and a voltage value between the a and a' points is K, a voltage at the a' point is K−(K/2+3/64K)=K/2−3K/64. Since the count of the output register OR which corresponds to K is 64, the OR content which represents the a' point is 29 (=32−3). This means that the operating point has moved from a point to the a' point.

The flow then returns to step S3 again, and the operations in steps S3 to S7 are repeated, so that the operating point reaches point G. When the optical head is further shifted to the right, the above operations are repeated by using the G point as an initial point.

When the D point is used as an initial operating point to shift the optical head to the left, and the content of the output register OR is incremented in step S4 of FIG. 10, YES is obtained in step S6 when the operating point reaches the C point. In this case, the operations in steps S11 to S13 are performed. As is easily understood from the previous explanation, these operations are for moving the operating point from the c point to the c' point.

When the optical head is shifted to the right or left, the encoder phases are sequentially switched to gradually move the optical head. That is, since the target value is gradually changed upon phase switching, optical head movement without an excessive increase in acceleration, which is caused by phase switching can be achieved.

During head movement, if the optical head is displaced upon application of an external impact and by the resultant vibrations to the optical disk apparatus, the operations in steps S8 to S10 or S11 to S13 are performed when the operating point crosses the a, b, c, and d points, thereby equivalently increasing the monotonous increase region of position detection in the same manner as in the first embodiment.

A third embodiment of the present invention will be described below.

Figure 11:
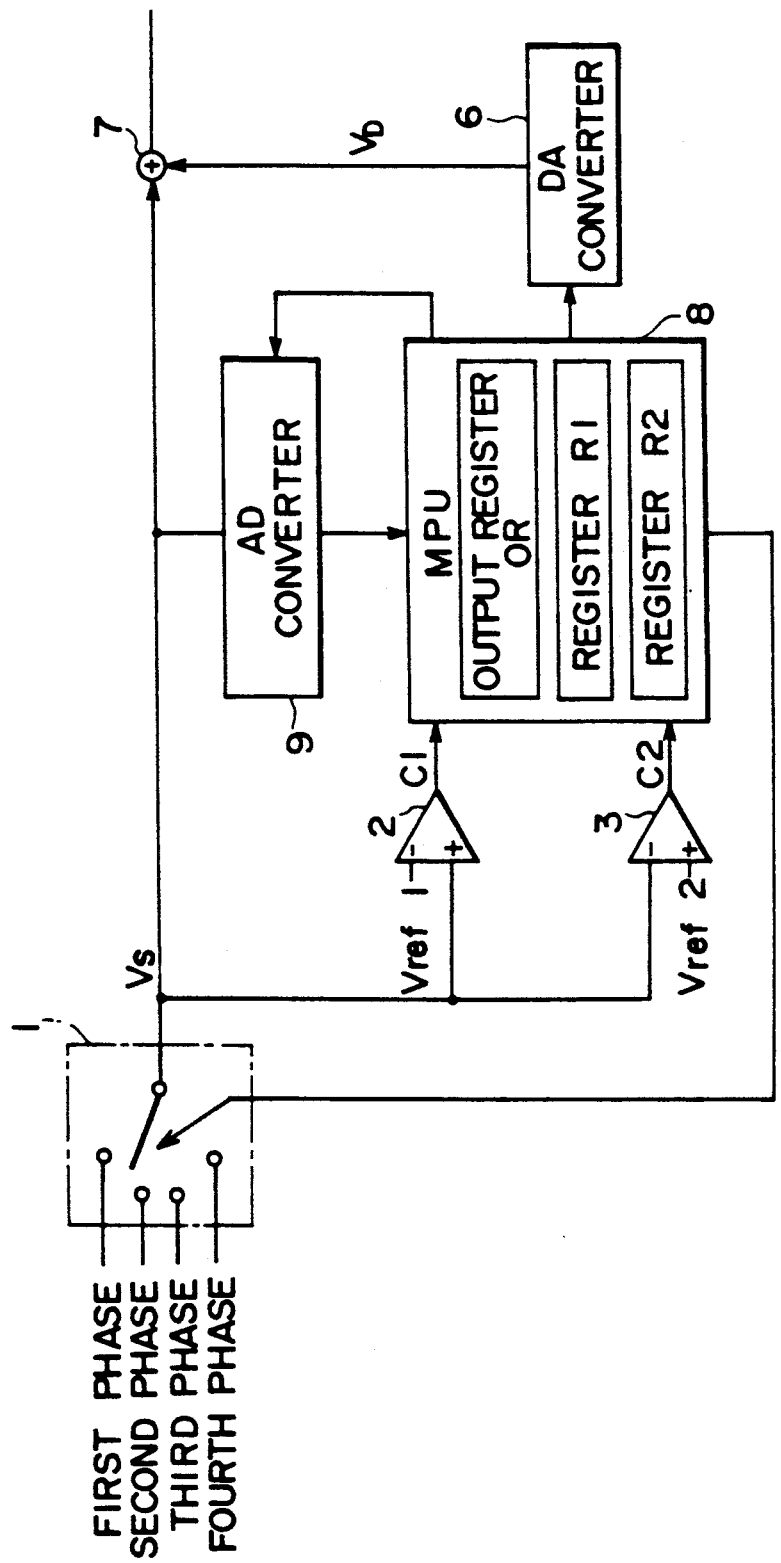
FIG. 11 is a block diagram showing a third embodiment of the present invention.

FIG. 11 is a block diagram of a position detecting device according to the third embodiment. The position detecting device of the third embodiment is substantially the same as that of FIG. 9, except that an output VS from a multiplexer 1 is converted into digital data by an analog-to-digital (AD) converter 9, and the digital data is input to an MPU 8.

Figure 12:
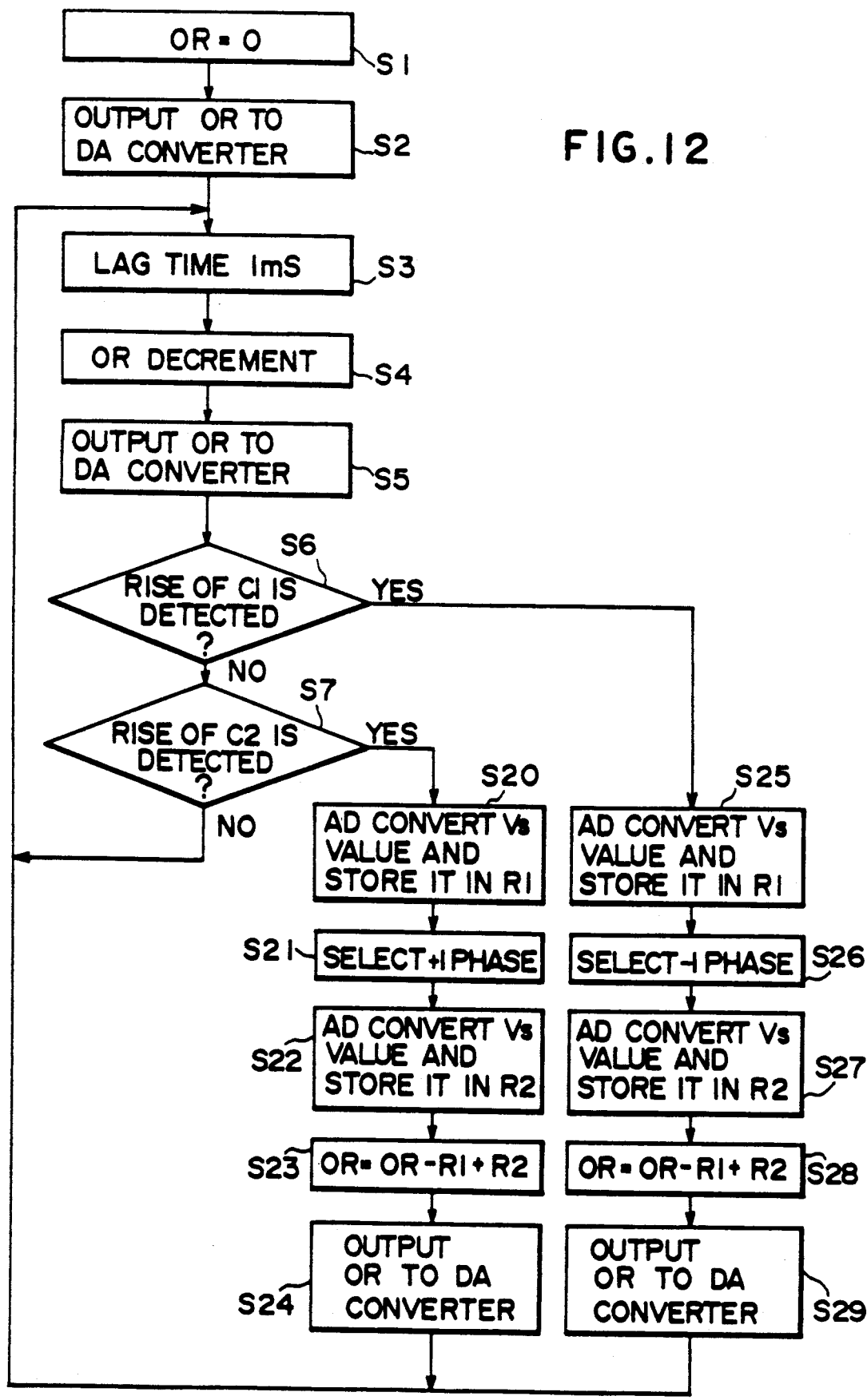
FIG. 12 is a flow chart for explaining an operation of the third embodiment.

FIG. 12 is a flow chart for explaining an operation for gradually moving an optical head by the arrangement of the third embodiment. The operations in steps S8 to S10 and S11 to S13 in FIG. 10 are replaced with the operations in steps S20 to S24 and S25 to S29.

The operations of the third embodiments are different from those of the second embodiment in the following respects. When the point a is detected (step S7) in FIG. 8, a voltage at the a point is accessed by the AD converter 9 (step S20), and then the phase is changed (step S21) to access a voltage at the a' point (step S22). A difference between the voltages at the a and a' points is added to the present target value (steps S22 and S23) (operations in steps S25 to S29 are performed upon detection of the c point). Therefore, even if variations in signal waveforms of the respective phases are present, a change in target value during phase switching can always be performed with accuracy.

The present invention is not limited to the particular embodiments described above. Various changes and modifications may be made within the spirit and scope of the invention. Position control during movement of the optical head is exemplified in the above embodiments. The present invention may be used to perform position control during linear or circular movement of an optical disk. Furthermore, the present invention may be utilized for apparatuses for performing optical head position control or optical card position control in an optical card apparatus, an optomagnetic disk apparatus, and the like. The present invention can also be applied to other apparatuses except for optical information processing apparatuses.

In each of the first to third embodiments, phases of the alternating signals are detected by the voltage comparators 2 and 3. However, as shown in FIG. 8, a signal of an α phase may be formed by adding the signals of the first and second phases and a signal of a β phase may be formed by adding the signals of the second and third phases to detect a phase of the alternating signal by the voltage comparators 2 and 3 upon detection of a zero-crossing point of each signal of the α or β phase, thereby obtaining the same effect as described above.

The present invention should be deemed to include all applications falling within the scope of the appended claims.

What is claimed is:

1. A position detecting device comprising:
   alternating signal generating means for generating a plurality of alternating, phase-shifted signals which alternate in accordance with changes in position or angle of a movable member;
   selecting means for selecting one of the plurality of alternating signals;
   signal supplying means for selectively supplying signals having output levels different from each other;
   adding means for adding one of the alternating signals selected by said selecting means and one of the signals supplied from said signal supplying means, and for outputting a sum signal as a position detection signal; and
   phase detecting means for detecting the selected alternating signal and for outputting signals to said selecting means and said signal supplying means when a phase of the selected alternating signal reaches a predetermined phase, and said selecting means comprising means for switching the selected alternating signal and said signal supplying means comprising means for supplying another one of the signals having a different output level to said adding means, in response to a signal from said phase detecting means.

2. A device according to claim 1, wherein said selecting means further comprises means for changing the selected alternating signal into an alternating signal phase-lagged with respect to a direction of a change in phase of the selected alternating signal, in response to a signal from said phase detecting means.

3. A device according to claim 1, wherein said signal supplying means further comprises means for selectively supplying a plurality of signals having predetermined output levels different from each other, such that a difference between output levels of the plurality of signals supplied is set to be equal to a difference between output levels of the alternating signals upon switching of the alternating signals by said selecting means.

4. A device according to claim 1, wherein said signal supplying means further comprises a first register for storing an output level value of a signal being supplied, a second register for storing an output level of a selected alternating signal, a third register for storing an output level of a next selected alternating signal, means for adding a difference between output levels stored in said second and third registers to an output level value stored in said first register, in accordance with a signal from said phase detecting means, and means for supplying a signal having an output level of the summed value as a next signal.

5. A device according to claim 1, wherein said alternating signal generating means comprises means for generating four phase alternating signals, phases of which are respectively shifted from each other by ninety degrees.

6. A device according to claim 1, wherein said alternating signal generating means comprises an encoder.

7. A device according to claim 1, wherein said phase detecting means comprises a first comparator for comparing the selected alternating signal with a first reference value and a second comparator for comparing the selected alternating signal with a second reference value having a polarity different from that of the first reference value.

8. A device according to claim 7, wherein an absolute value of the first reference value is set to be unequal to an absolute value of the second reference value in said first and second comparators.

9. A device according to claim 7, wherein said selecting means further comprises a first up/down counter having a decrement terminal for entering an output of said first comparator and an increment terminal for entering an output of said second comparator, and a multiplexer having a plurality of terminals for respectively entering the plurality of alternating signals, and means for switching said plurality of terminals in accordance with a count value of said first up/down counter.

10. A device according to claim 9, wherein said signal supplying means further comprises a second up/down counter having a decrement terminal for entering an output from said first comparator and an increment terminal for entering an output from said second comparator, and a digital-to-analog converter for outputting a signal having a voltage value corresponding to a count value of the second up/down counter.

11. A device according to claim 10, wherein said means for outputting a sum signal as a position detection signal comprises an adder for adding an output signal of said digital-to-analog converter to an output signal of said multiplexer.

12. A device according to claim 7, wherein said signal supplying means further comprises a microprocessor unit comprising a register for entering outputs from said first and second comparators to gradually decrement the count value and a digital-to-analog converter for outputting a voltage corresponding to a count value of said register.

13. A device according to claim 12, wherein said microprocessor unit detects edges of output signals of said first and second comparators, and outputs an instruction signal to provide instructions for switching signals to said selecting means.

14. A device according to claim 13, wherein said selecting means comprises a multiplexer having a plurality of terminals for respectively entering the plurality of alternating signals, and means for switching said terminals in accordance with an instruction signal from said microprocessor unit.

15. A position detecting device comprising:
alternating signal generating means for generating a plurality of alternating, phase-shifted signals which alternate in accordance with changes in position or angle of a movable member;
a selection circuit having a plurality of input terminals for respectively entering the plurality of alternating signals, and an output terminal for outputting one of the alternating signals;
a signal supply circuit for selectively supplying signals having output levels different from each other;
an adding circuit for adding one of the alternating signals output from the output terminal of said selection circuit and one of the signals supplied from said signal supply circuit, and for outputting a sum signal as a position detection signal; and
a comparison circuit for comparing an output level of the alternating signal output from said selection circuit with a reference value, and for outputting an instruction signal to provide instructions for switching signals to said selection circuit and to said signal supply circuit when the output level exceeds the reference value, and said selection circuit switching the alternating signal output in response to an instruction signal from said comparison circuit and said signal supply circuit supplying another one of the signals having a different output level to said adding circuit, in response to an instruction signal from said comparison circuit.

16. A device according to claim 15, wherein said selection circuit connects the output terminal to a different input terminal in response to an instruction signal from said comparison circuit and changes the alternating signal output into an alternating signal phase-lagged with respect to a direction of a change in phase of the alternating signal.

17. A device according to claim 15, wherein said signal supply circuit selectively supplies a plurality of signals having predetermined output levels different from each other, such that a difference between output levels of the plurality of signals supplied is set to be equal to a difference between output levels of the alternating signals upon switching of the alternating signals by said selection circuit.

18. A device according to claim 15, wherein said signal supply circuit comprises a first register for storing an output level value of the signal being supplied, a second register for storing an output level of the alternating signal being supplied from said selection circuit, and a third register for storing an output level of a next selected alternating signal from said selection circuit, and for adding a difference between output levels stored in the second third registers to an output level value stored in the first register, in accordance with a signal from said comparison circuit, and for supplying a signal having a sum output level as a next signal.

19. A device according to claim 15, wherein said alternating signal generating means comprises an encoder for generating four phase signals, phases of which are respectively shifted from each other by ninety degrees.

20. A device according to claim 15, wherein said comparison circuit comprises a first comparator for comparing an alternating signal output from said selection circuit with a first reference value, and a second comparator for comparing an alternating signal output from said selection circuit with a second reference value having a polarity different from that of the first reference value.

21. A device according to claim 20, wherein an absolute value of the first reference value is set to be unequal to an absolute value of the second reference value in said first and second comparators.

22. A device according to claim 20, wherein said selection circuit comprises a first up/down counter having a decrement terminal for entering an output of the first comparator and an increment terminal for entering an output of the second comparator, and a multiplexer, having a plurality of input terminals and an output terminal, for changing the connection between said plurality of input terminals and said output terminal in accordance with a count value of said first up/down counter.

23. A device according to claim 22, wherein said signal supply circuit comprises a second up/down counter having a decrement terminal for entering an output of the first comparator and an increment terminal for entering an output of the second comparator, and a digital-to-analog converter for outputting a singal having a voltage value corresponding to a count value of the second up/down counter.

24. A device according to claim 20, wherein said signal supply circuit comprises a microprocessor unit comprising a register for entering outputs from the first and second comparators to gradually decrement the count value and a digital-to-analog converter for outputting a voltage corresponding to a count value of the register.

25. A device according to claim 24, wherein said microprocessor unit detects leading edges of the output signals of the first and second comparators and outputs an instruction signal to provide instructions for switching signals to said selection circuit.

26. A device according to claim 25, wherein said selection circuit comprises a multiplexer having a plurality of input terminals and an output terminal for changing the connection between said plurality of input terminals and said output terminal, in accordance with an instruction signal from said microprocessor unit.

* * * * *

UNITED STATES PATENT AND TRADEMARK OFFICE
CERTIFICATE OF CORRECTION

PATENT NO. : 5,067,118
DATED : November 19, 1991
INVENTOR(S) : Shigeto Kanda

It is certified that error appears in the above-identified patent and that said Letters Patent is hereby corrected as shown below:

On Title page, item [56]

<u>U.S. PATENT DOCUMENTS</u>

"4,416,002 9/1983 Oguino, et al." should read
--4,416,002 11/1983 Oguino, et al.--; and
"4,590,527 5/1986 Waner" should read
--4,590,527 5/1986 Warner--.

<u>IN THE ABSTRACT</u>

Line 2, "a:" should read --a--;
Lines 6 and 7, "supplier" should read --a supplier-- and "adder" should read --an adder--.

<u>IN THE DISCLOSURE</u>

<u>COLUMN 2</u>

Line 56, "step" should read --step,--.

UNITED STATES PATENT AND TRADEMARK OFFICE
CERTIFICATE OF CORRECTION

PATENT NO. : 5,067,118

DATED : November 19, 1991

INVENTOR(S) : Shigeto Kanda

It is certified that error appears in the above-identified patent and that said Letters Patent is hereby corrected as shown below:

COLUMN 3

Line 12, "inconvenient," should read --is inconvenient,--.

COLUMN 10

Line 2, "second" should read --second and--; and
Line 39, "singal" should read --signal--.

Signed and Sealed this

First Day of June, 1993

Attest:

MICHAEL K. KIRK

*Attesting Officer*     *Acting Commissioner of Patents and Trademarks*